INVENTOR
TIMOTHY R. PRYOR

BY Larson and Taylor

ATTORNEYS

INVENTOR
TIMOTHY R. PRYOR

BY *Larson and Taylor*

ATTORNEYS

United States Patent Office 3,458,257
Patented July 29, 1969

3,458,257
METHOD AND APPARATUS FOR DETECT-
ING SPATIAL RELATIONSHIPS AND FOR
DETERMINING PROPERTIES DERIVED
THEREFROM
Timothy R. Pryor, 5423 York Lane,
Bethesda, Md. 20014
Filed Oct. 8, 1964, Ser. No. 402,449
Int. Cl. C01b *11/16;* H01j *39/12;* C02b *5/14*
U.S. Cl. 356—32                          9 Claims

ABSTRACT OF THE DISCLOSURE

A device for measuring strain on a member which member is provided with a diffraction grating of not more than 4000 lines per inch cut into the member. The device includes a light source to direct light having a wavelength of at least 6000 A., for example 85,000 A., at the grating, and a plurality of photodetector devices having light receiving surfaces disposed along the path of motion described by an order of light diffracted from said grating upon subjecting the member to stress to measure the angle described by the diffracted order between first and second conditions of stress from which the strain can be determined.

This invention relates to a method and apparatus for detecting the special relationship between points on a member. More particularly, the invention relates to a method and apparatus for detecting changes in distance between closely spaced lines or reflecting surfaces provided on a member. Even more particularly, the invention relates to a method and apparatus for the determination of properties or quantities, such as strain or temperature, which are related to linear motion of, or distances between, such lines or reflecting surfaces, and which may be derived therefrom.

Figure 1:
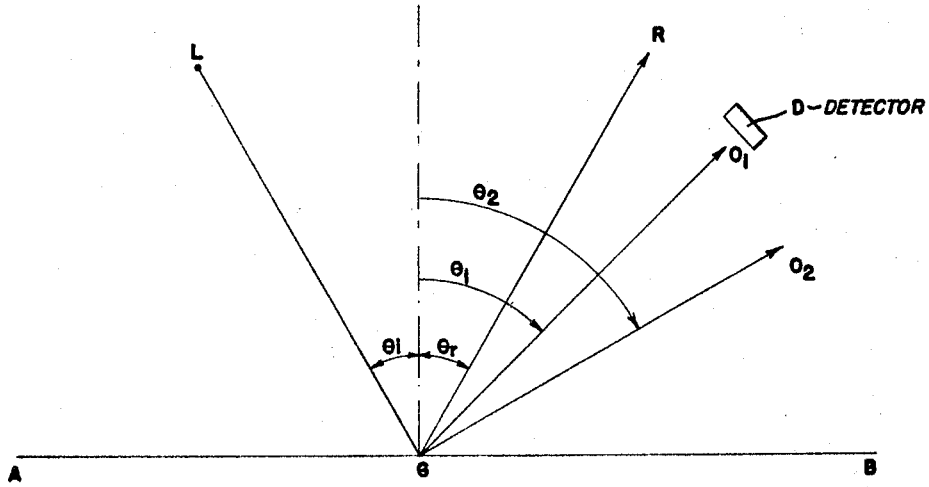

A device and method of this general type is known as exemplified by Bell, United States Patent No. 2,929,242 issued Mar. 22, 1960. As shown therein, the strain in a member can be determined by providing a member with a diffraction grating and equating the strain in the member to the separation between lines in the grating which is detected by measuring the angle of an order of light (while correcting for any rotation of the member) diffracted from the grating. With reference to FIG. 1, which, for simplicity of presentation, omits the correction for member rotation, the system for determination of strain requires a light source L, a detector D, and a grating G disposed on the surface AB of a member arranged as shown.

Incident light from source L impinges upon grating G at an angle $\theta_i$ with respect to the vertical and is reflected therefrom along line GR at an equal angle $\theta_r$. Incident light is also diffracted by grating G into a diffraction pattern constituting various orders of diffracted light such as the first order $GO_1$, and second order $GO_2$. The angles ($\theta_1$, $\theta_2$) of diffracted orders are dependent upon the grating law which may be represented as:

$$(\sin \theta_n - \sin \theta_i) = nm\lambda \quad (1)$$

wherein $\theta_n$ = the angle of diffraction for a given order $n$,
$n$ = order of diffraction
$m$ = number of lines per inch
$\lambda$ = wavelength of diffracted light, inches.

Where the number of lines per inch $m$ is known, the foregoing relationship is used, e.g. to determine wavelength. However, the relationship may be utilized to determine strain which can be derived by determining a change in the quantity $m$ due to strain in the member which causes a change in the length $l$ of the member and consequently causes a change in the number of lines per unit length.

Stated simply, a change in unit length (strain) can be determined as follows:

$$e = \frac{m_2 - m_1}{m_2} \quad (2)$$

Wherein $e$ = strain = change in unit length = $\frac{l_1 - l_2}{l_1}$ $m_1$ = grating lines per inch under first condition of stress, and
$m_2$ = grating lines per inch under second condition of stress.

The values $m_1$ and $m_2$ are, of course, obtained from Equation 1 by measuring $\theta_n$ under first and second strain conditions. For strain due to compression, $e$ will be positive and for strain due to elongation, $e$ will be negative.

Stress can be determined by known computation if desired.

The change in the number of lines per inch is also a function of temperature and temperatures can be calculated for bodies having a known coefficient of expansion. In measuring for strain, compensation for any temperature change is, of course, necessary.

As disclosed by Bell, a uniform light field is focused on the grating and the angle of a diffracted order of light is measured by measuring the quantity of light passing through a V slit. The quantity of light passing through the slit is a function of the angle measured due to the tapered configuration of the slit.

Bell's device, however, is large, complex, and requires extremely fine gratings which are not realizable except in a very few laboratories. In addition, changes in source intensity, detector sensitivity and background light conditions over time render long term (e.g. comparing strains one month apart) measurements of strain difficult—if not impossible.

It is an object of this invention to provide a method and device for detecting changes in the linear distance between moveable points and to detect the rate of change of such distance and for determining properties or quantities derivable therefrom. It is a further object of this invention to provide a compact device of this type and to provide a method and device which do not require calibration for changes in source intensity, detector sensitivity or background illumination. It is still a further object of the invention to provide a method and device for such measurements which utilize a readily obtainable grating. It is still further an object to this invention to provide a method and device for such measurements which require only that the "grating" consist of two mirror surfaces arranged in various ways. It is a further object of the invention to provide a method and apparatus for the measurement of both very large and very small strains and for the measurement of rapidly changing strains.

Figure 2:
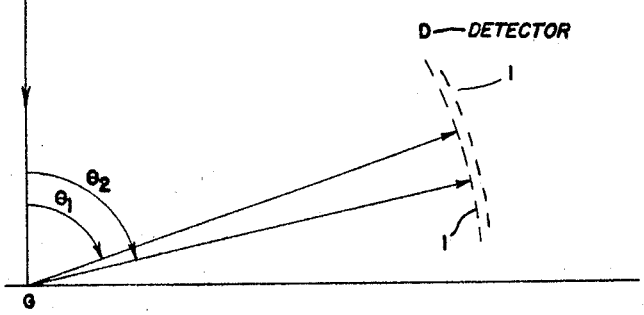
Figure 3:
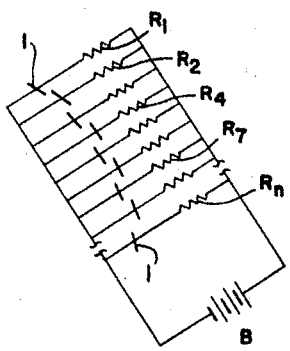
Figure 4:
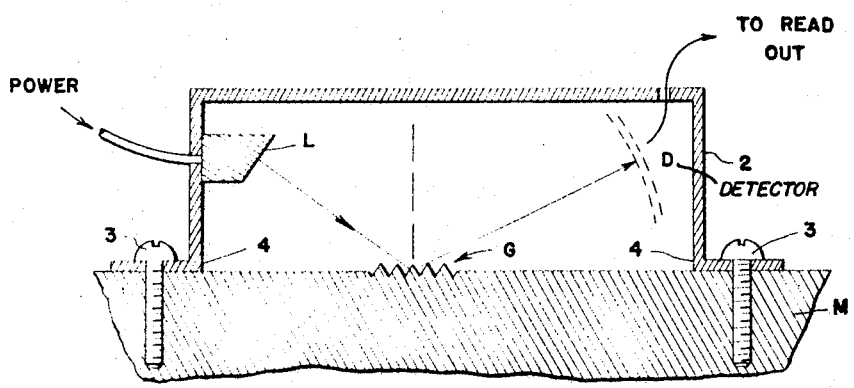
Figure 5:
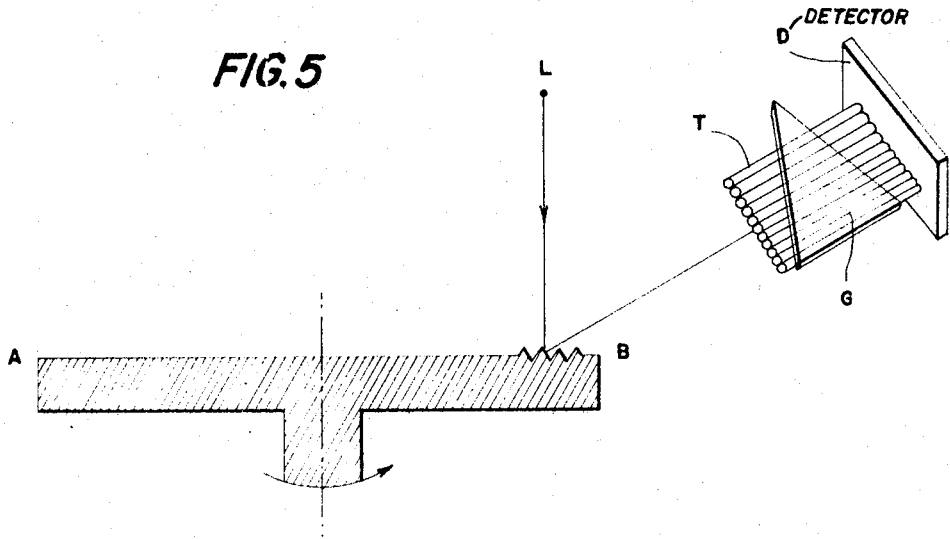

These and other objects are achieved according to the present invention by providing, in a system shown diagrammatically in FIG. 1, a specialized light source L and detector D together with grating G which can be easily provided on a member, each of which will be more fully described hereinafter with reference to the following specification wherein specific and preferred embodiments of the invention are described and in the drawings wherein like designations refer to like parts and wherein:

FIG. 1 is a diagrammatic representation of the relationship between incident, reflected and diffracted light and a diffraction grating, FIG. 2 is a diagrammatic representation of the relationship between light impinging normally with respect to a diffraction grating, FIG. 3 is a diagrammatic representation of a read-out detector device, FIG. 4 is a cross-sectional view of a device secured to a member, FIG. 5 is a diagrammatic representation of a rotatable member provided with a diffraction grating and a detector device incorporating fiber optic tubes.

With reference to FIGURE 2, a coherent light-emitting diode (L) was mounted such that light therefrom impinged normal to a grating G. The diode employed was an RCA type TA-2440 gallium arsenide diode having a continuous output (at $-200°$ C. maintained by liquid nitrogen cooling) of 100 mw. at 1.5 volts and 20 amps. input. The light emitted therefrom had a bandwidth of 8 A. with a central wavelength of $0.85\mu$ ($3.55 \times 10^{-5}$ in.). Similar performance from this diode can be obtained at room temperature with a pulsed operation.

As the angle of incident light $\theta_i$ is 0, the grating law becomes:

$$\sin \theta n = nm\lambda \quad (3)$$

For maximum sensitivity, $\theta_n$ should be as large as conveniently possible. Assuming $\theta_n$ to be $80°$ (arcsin 0.9848), then $$nm = \frac{0.9848}{3.55 \times 10^{-5}}$$
$$= 2.77 \times 10^4$$

Thus, the value of lines per inch $m$ will be equal to $2.77 \times 10^{-4}/n$. Where $n$ is, e.g., 10, then $m = 2770$ lines per inch, and a grating having this number of lines per inch can be easily cut in the surface of a member such as a steel beam. The larger the value of $m$, the more difficult to provide a grating. Where $m$ is less than 2000, the grating is quite easily prepared. Where $m$ is over 300, complex techniques which involve great care are required.

The detector device shown in FIG. 2 comprises a plurality of small photoconductors 1 accurately disposed and staggered such that no gap exists between successive elements as viewed from grating G. Each photoconductor presents a 0.01" x 0.01" surface area, or less, to the diffracted light. Such photoconductors are readily available and may be a square centimeter in area or larger when the detector is located remote from the grating. Smaller detectors permit greater resolution at short distances, however, and are preferred for compact devices. A typical detector for use with the $0.85\mu$ RCA type TA-2440 described above is the SD-100 (E, G and G) silicon photodiode having an active area of 0.11 in.²; rise time $10^{-9}$ sec.; operating in the photoconductive regime with a 1–10 volt bias.

Strain $e$, which is equal to $$\frac{\Delta l}{1} = \frac{l_1 - l_2}{l_1} = \frac{m_2 - m_1}{m_2}$$

related to $\theta_2$ as follows:

$$\sin \theta_2 = \frac{n\lambda m_1}{(1-e)} = \frac{\sin \theta_1}{(1-e)} \quad (4)$$

as derived from Equations 2 and 3, above. For the exemplified structure, therefore, and for a compressive strain of 0.01, then $$\theta_2 = \arcsin \frac{(0.9848)}{(0.99)} = 84° \ 3'$$

and for a compressive strain of 0.001, then $$\theta_2 = \arcsin \frac{(0.9848)}{(0.999)} = 80° \ 16'$$

Where the distance GD is 4 inches, a change in angle of $4°3'$ (corresponding to a change in strain of 0.01) causes a given order, therefore, to describe an arc of approximately 0.283", which corresponds to a sweep of about 28 detectors having a width of 0.01".

Correspondingly, a change in strain of 0.001 will cause a given order to describe an arc of about 0.0187" which corresponds to a sweep of about 2 detectors.

In a manner similar to that described above with respect to a gallium arsenide light-emitting diode, in indium arsenide coherent light emitting diode having a central wavelength of $3.1\mu$ (equals $1.22 \times 10^{-4}$ inhes) was used.

From Equation 3, the grating law becomes:

$$\sin \theta_n = nm(1.22 \times 10^{-4}) \quad (5)$$

For a sensitive angle of $80°$, $$\sin \theta_n = 0.9848 = nm(1.22 \times 10^{-4})$$

and the $nm$ product equals $$\frac{0.9848}{1.22 \times 10^{-4}}$$

or $8.1 \times 10^3$. Again choosing $n$ as 10, $m$ equals about 810 lines per inch as compared with the value of 2770 lines per inch for the gallium arsenide light source. A grating of only 810 lines per inch is very easily provided on a member. Further, if it is desired to study the fourth order angle of diffraction, a grating of only about 200 lines per inch would be required. This is a far less stringent requirement than a grating that would be required with visible light of, for example, 5400 A. ($=2.22 \times 10^{-5}$ in.). For the same value of $\theta$ ($80°$) the number of lines per inch required would be over 46,000 for the first order and over 11,000 for the fourth order of diffracted light.

With a suitable read-out arrangement as shown in FIGURE 3 the arc described by the 4th order can be directly detected either as an angular value or as a strain value.

The read-out device shown in FIGURE 3 requires a plurality of lights $R_1$, $R_2$----$Rn$ each in series with a photoconductor 1 which decreases resistance upon exposure to light. Kodak "Ektron" PbSe photoconductive cells, capable of detecting $3.1\mu$ radiation at room temperature, were used with the indium arsenide diode. The "Elktron" cells had a respons time of less than $10^{-5}$ sec. Photoconductive diodes or photovoltaic diodes, which can achieve faster response times of, e.g. $10^{-8}$ sec., may be used. The voltage of battery B is selected such that in the absence of substantial incident light, no bulb will light. When a given order of light diffracted from grating G strikes a given photoconductor, the total resistance in an isolated photoconductor—light circuit drops—thus causing the bulb to light. The lights may be mounted on a numbered board and the numbers may be in angles $\theta$ or lines per inch $m$ or any convenient value convertible to strain $e$.

Devices according to the present invention may conveniently be mounted within a housing 2 as shown in FIGURE 4. Due to the small physical size of the light source L and Detectors $d$, the size of the housing need be no larger than a few cubic inches. In a device employing 100 "Ektron" photoconductors measuring about 0.01" x 0.01", a housing 1" x 1" x 4" is sufficient Where a battery supply Z as shown in FIGURE 3 is utilized, it may be located within or without the housing. A grating G is provided on the surface of a member $m$ and this grating does not require a great many lines per inch in accordance with the present invention. Suitable means, either temporary or permanent, may be used to affix the housing. It is contemplated that the housing may be permanently affixed to the member or may remain accessible and removable therefrom. The light source L and detector D are fixed with respect to the housing and hence are also fixed with respect to the grating G. A suitable aperture bounded by the housing at 4 exposes grating G to incident light. The aperture may be smaller than shown for structural rigidity.

Using the aforedescribed light source and detector, it is merely necessary to "pot" the appropriate electrical leads such as power to the light source and detector and connections to the read-out device in order to provide a compact and effective self-contained unit that may remain in place for long periods of time.

Since no physical attachment need be made to the specimen, the member may be a moving part such as a wheel. In FIGURE 5, a grating having a few lines according to the present invention is provided on a portion of member AB which portion rotates about the axis shown. The relationship between the grating, light source and detector is the same as previously described. The detector shown in FIGURE 5 comprises a plurality of fiber optic tubes T each having one end disposed towards the grating and which may be either in-line as shown or arcuately arranged. The tubes serve to convey light to a detector D to which the tubes are optically connected. While the tubes are shown straight and connected to the detector in a straight line, it is to be understood that the tubes are flexible and may be connected such that the angle subtended by the tubes is much greater than that subtended by the detector itself. The light conveyed to the detector D is attenuated by a glass wedge G which taps off a portion of light passing through each tube. The quantity of light reaching the detector will therefore be dependent upon which tube is illuminated which, in turn, depends upon the angle of light diffracted from the grating. This system permits the use of a long wavelength light source (as but one small infrared detector is required) and is simpler to operate and smaller in size than the Bell device. Where long wavelengths are employed (as from A $3.39\mu$ Perkin-Elmer model 5200 gas laser), the fiber optic tube should be quartz or plastic as common glass does not pass the larger wavelengths efficiently.

Alternatively, the use of fiber optic tubes can provide greater sensitivity than can be achieved with a plurality of presently available detectors arranged as shown in FIGURES 2 and 5. Tubes presently available have a diameter of only $10^{-3}$ cm. whereas detectors are relatively massive. Each tube is optically connected to a detector to achieve a vast increase in sensitivity which could otherwise be achieved by the development of tiny detectors. Using the presently available tubes, however, and in a small device as shown in FIGURE 4 wherein the distance GD is 4 inches, each tube would subtend an angle $\theta$ of arctan $10^{-4}$. Conversely, a smaller structure can be used or the grating requirements may be relaxed.

While the foregoing examples specify various light sources and detectors, it is to be understood that larger wavelength sources are available together with suitable detectors and that even larger wavelength sources and detectors will be developed. For example, two lasering diodes were recently developed at Lincoln Laboratory. A lead telluride diode laser was operated at 6.5 microns when cryogenically cooled. This source could be matched, according to the present invention, with an indium antimony photo electromagnetic single crystal detector operated at room temperature. A lead selenide diode laser, however, produced an output of 8.5 microns when cryogenically cooled. This could be used with a cooled germanium-silicon:gold single crystal photoconductor. With reference to Equation 3, for an angle $\theta$ of 80° and where $n=10$, then $$m = \frac{0.9848}{(10)(3.3 \times 10^{-4})} = 300 \text{ lines per inch}$$

This grating can be very easily provided on the member. Similarly, for the 3rd order, a grating of about 1000 lines (which can be easily provided) will suffice.

The grating is provided on the member in any convenient manner such as by etching or cutting. The number of lines necessary may be further decreased by employing "Eschellettes" in conjunction with long wavelength infrared light sources. The grating grooves are cut such as to direct almost all of the light into a particular order. (See Philosophical Magazine, vol. 20, p. 534; R. W. Wood, The Eschellette Grating for the Infra Red; Trowbridge and Wood, Philosophical Magazine, vol. 21) These devices will permit the use of a grating of only e.g. 162 lines/inch to detect the 30th order for light having a wavelength of $5\mu$ (indium antimonium diode or xenon gas laser) and incident at 80°.

Methods and apparatus according to the present invention provide a practical optical system for detection of strain or other quantities derived from a change in distance between two moveable points. The device is rendered practical by, in some cases, a direct angle measurement rather than an intensity measurement and, in all cases, by a reduction of the number of lines per inch for the grating. Furthermore, the ends of the invention can be obtained with extremely small, miniature, components.

I claim:

1. A device for measuring strain over long periods of time in a member having a diffraction grating thereon of not more than 4000 lines per inch comprising a small housing secured to said member adjacent said grating, light source means located in said housing to direct light having a wavelength of at least 6000 A. on said grating independently of stress applied to said member, and photodetector means located in said housing comprising a plurality of discrete individual light receiving surfaces disposed along the path described by an order of light diffracted from said grating upon subjecting said member to stress to detect the angle of said order of light diffracted from said grating under different conditions of stress, said light receiving surfaces being positioned to eliminate non-light-detecting areas between said individual light receiving surfaces, said device serving to measure strain in said member over long periods of time without regard to variation in source intensity, detector sensitivity or reflectivity of said grating and without regard to background illumination.

2. A device as claimed in claim 1 wherein said photodetector means comprises a plurality of photodiodes disposed in an arc.

3. A device as claimed in claim 2 wherein said photodiodes are disposed in a plurality of arcs and offset to eliminate non-light-detecting areas between individual photodiodes.

4. A device as claimed in claim 2 wherein said light source comprises a crystal laser.

5. A device as claimed in claim 2 wherein said light source comprises a semiconducting diode laser.

6. A device as claimed in claim 2 wherein said light sources comprises a gas discharge laser.

7. A device according to claim 1 wherein said photodetector means comprises a plurality of fiber optic tubes having first ends which comprise said light receiving surfaces aligned in an arc along said path and having second ends each associated with a discrete photodetector to detect light passing through said fiber optic tube.

8. A device according to claim 1 wherein said photodetector means comprises a plurality of fiber optic tubes having first ends which comprise said light receiving surfaces aligned in an arc along said path and having second ends associated with a single photodetector to detect the total amount of light passing through said fiber optic tubes and further including means to attenuate light passing through each fiber optic tube.

9. A method of determining strain in a member over long periods of time comprising the steps of: providing a diffraction grating having less than 4,000 lines per inch on a surface of said member; directing light having a wavelength of at least about 6,000 A. on said diffraction gating; providing a plurality of discrete light receiving surfaces to receive light from said grating; positioning said light receiving surfaces to eliminate non-light detecting areas between said discrete light receiving surfaces; inducing an initial condition of stress to cause a diffracted order of light to fall upon one of the plurality of discrete individual light receiving surfaces disposed along the path of motion described by said diffracted order upon subjecting said member to stress to change the grating spacing; measuring the angle of an order of diffracted light under said initial stress condition by determining the individual light receiving surface upon which said diffracted order of light falls; subjecting said member to an unknown stress and, subsequently, measuring the angle of said order of diffracted light by determining the individual light receiving surface upon which said diffracted order of light falls; and determining strain on said member at the unknown condition of stress relative to the strain at said initial condition of stress by measuring the shift in angle of said order of diffracted light, whereby strain can be determined in said member over long periods of time without regard to variations in source intensity, detector sensitivity, or reflectivity of said grating and without regard to background illumination.

References Cited

UNITED STATES PATENTS

| | | |
|---|---|---|
| 2,929,242 | 3/1960 | Bell. |
| 2,936,381 | 5/1960 | Long. |
| 2,993,997 | 7/1961 | McFarlane. |
| 3,184,961 | 5/1965 | Bell. |
| 3,216,315 | 11/1965 | Keller _____ 350—162 X |
| 3,259,014 | 7/1966 | Johnson et al. |
| 3,312,140 | 4/1967 | Dokoupil. |
| 3,335,367 | 8/1967 | Skooglund et al. |

RONALD L. WIBERT, Primary Examiner

J. ROTHENBERG, Assistant Examiner

U.S. Cl. X.R.

250—220; 331—94.5; 350—96